Aug. 15, 1961
S. LACROIX
2,996,354
PROCESS FOR TREATING POWDERED MATERIALS
WITH GASES AND RESULTANT PRODUCTS
Filed Oct. 7, 1957
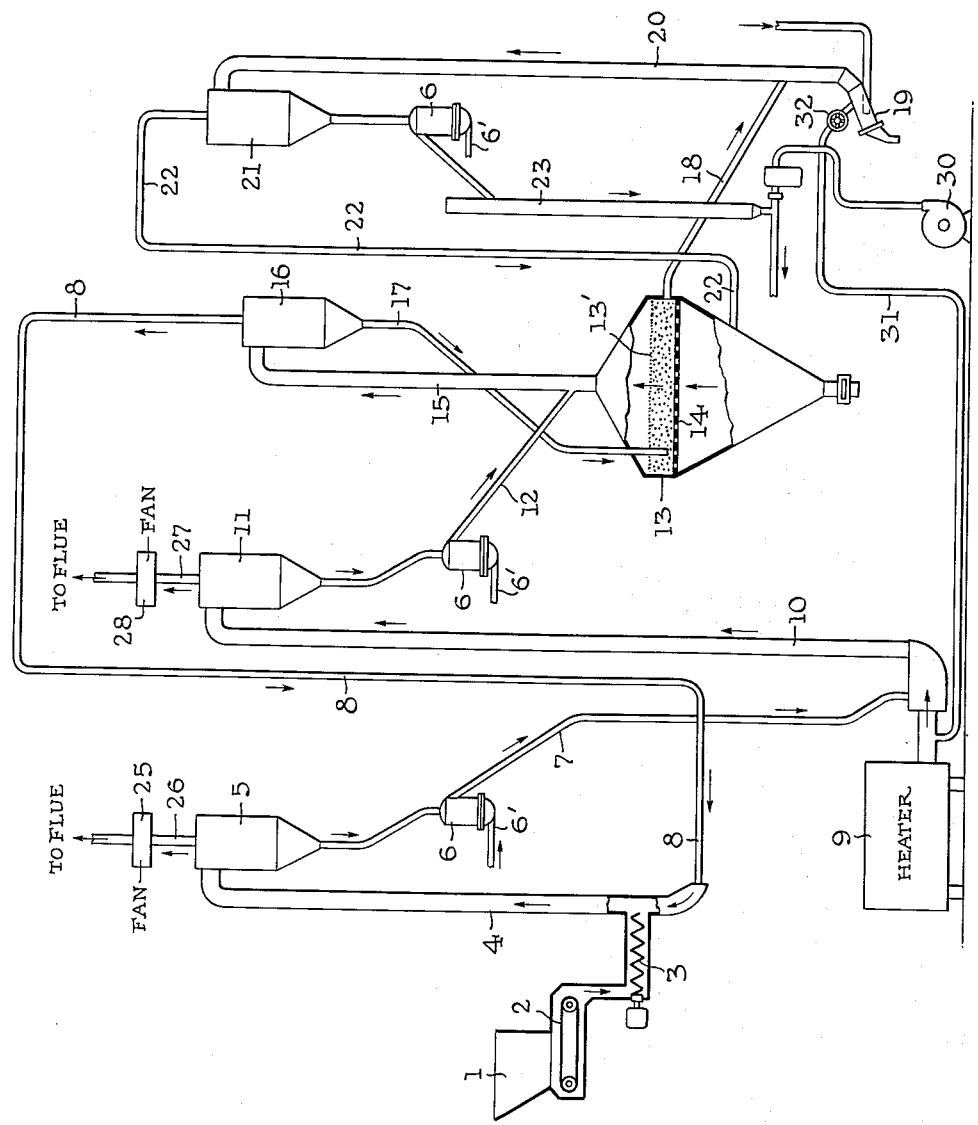
INVENTOR
Séraphin Lacroix
BY
ATTORNEY

2,996,354
PROCESS FOR TREATING POWDERED MATERIALS WITH GASES AND RESULTANT PRODUCTS

Séraphin Lacroix, Salindres, France, assignor to Pechiney, Compagnie de Produits Chimiques et Electrometallurgiques, Paris, France, a corporation of France
Filed Oct. 7, 1957, Ser. No. 688,450
Claims priority, application France Oct. 11, 1956
3 Claims. (Cl. 23—88)

The present invention which is based upon applicant's researches, relates to a new process for treating powdered solids with gases according to the "fluidization" technique; the invention also relates to an apparatus for carrying out this process.

It is well known to treat fluidized powdered solids with gases. However, when the operation is carried out at more or less elevated temperatures, and especially when a chemical reaction takes place, the yields, particularly, the thermal yields, are often unsatisfactory. Moreover, the operation very often requires a rather high power consumption for the apparatus used to secure circulation of the gases and powders.

The present invention produces an improvement which enables this type of operation to be carried out with considerably better quantitative (mass) and thermal yields. The invention makes it possible to use a considerably reduced amount of power for the circulation of the gases and powders while ensuring perfectly continuous, automatic operation. Further, the invention leads to an increase in the productive capacity of the apparatus.

The process, according to the invention, consists in the first place, in carrying out the treatment of the powder with one or more gases or vapors in at least three zones, wherein the powdered material is in a fluidized state, namely, a dilute phase pretreating zone, a dense phase reaction zone, and a dilute or dense phase recuperation zone.

A chemical reaction as well as a physical change, or both, can take place within said dense phase reaction zone, termed herein "principal fluidization" zone. Similarly, physical and/or chemical changes can take place within said pretreating and recuperation zones.

According to a preferred feature of the invention, the powder remains in contact with the gas for a short time only, i.e. of the order of a few seconds, during its passage through the pretreating and recuperation zones; in contrast, the time of contact of the powder with the gas within the reaction zone is rather long, i.e. of the order of several hours.

The actual times of contact depend, of course, upon the nature of the operation taking place and, particularly, on the reaction velocity when there is a chemical action between the gas and powder. The contact times can amount, for example, to a few seconds within the pretreating and recovery zones, while they can last several hours in the reaction zone.

According to the invention, two or more different gases or vapors can be made to act on the same powder. According to a particular feature of the invention, two or more of the gases or vapors act separately on the powder. For example, when heating gases—such as combustion gases, hot air, or others—serve to heat a powder which is additionally treated by another gas to produce a chemical reaction, the said heating gases act separately on the powder in zones distinct from those where the powder comes in contact with the reaction gases.

According to another feature of the invention, heating gases and reaction gases can act together on the powder in one or more common fluidization zones.

In a particular embodiment of the invention, entrainment of fresh powder takes place in the dilute phase pretreating zone by the gas or gases coming from the dense phase reaction zone through which the gas or gases have previously passed. Conversely, in the third zone, the so-called recuperation zone, fresh gas or gases entrain powder which has already been subjected to contact with gas in one or more preceding zones.

In the application of the invention, the pretreating zone which precedes the principal fluidization zone, and the recuperation zone which follows the latter, have the general function of making more complete the reaction or the heat transfer between the powder and the gas, or to attain both of these purposes simultaneously.

The new process can be advantageously applied to a large number of industrial operations, among which the following are cited by way of example: treatment of oxides or various other metallic compounds—such as $Al_2O_3$, $CaO$, $MgO$, $Na_2CO_3$, $UO_2$, $TiO_2$, etc.—with hydracids such as $HCl$, $HF$, etc.; hydrogenation operations, smelting of sulfides, dehydrations, various drying operations, etc.

The apparatus for carrying out the above described process according to the present invention comprises the combination of at least three chambers or groups of chambers provided with means for fluidizing a powder by a gas, means for separating the powder from the gas located between the outlet of one chamber and the inlet to the succeeding chamber, as well as means for circulating the powder and the gas in said chambers.

The first of said chambers—or the first group serving for pretreating—is preferably formed of one or more tubular bodies, i.e. ducts having a very high length/diameter ratio. These ducts are provided with suction or blowing devices to enable the powder to be completely entrained by the gas. The ducts can be vertical, inclined or horizontal; vertical ducts or those which are inclined up to 45° are preferred from the standpoint of ease of construction.

Separators, for example cyclones, are mounted at the outlet of the duct or ducts; the powder separated out in these cyclones is passed by a suitable connection to the following chamber, herein called "reaction chamber." The reaction chamber or chambers, generally designed for a longer residence time of the powder, consist of a casing or cylindrical body of large horizontal cross section. Each of these is provided with a bottom, or horizontal partition wall, perforated with orifices (openings) for the passage of the gas; a gas inlet is provided below said bottom, and a gas outlet above it.

One or more inlets for the powder are arranged above the perforated bottom. The powder inlets can be located close to or at the same level as the powder outlets, but at considerable distances therefrom, preferably, substantially equal to the greatest dimensions of the casing or the diameter of the cylindrical body. Or, conversely, the inlets can be placed at levels which are quite different from those of the outlets, for example in the vicinity of the perforated plate, while the outlets are located far above the latter near the top of the fluidized bed or layer.

The reaction chamber according to the invention can have a horizontal cross section which is larger than its vertical section, the path of the powder within the reaction chamber being then substantially horizontal. Alternatively, its height can be greater than its width, and the path of the powder is then substantially vertical.

The provision of at least one fluidization—recuperation—zone after the principal fluidization zone, leads to the result that the gas or gases arriving into the latter contain more or less dust of the treated material. In order to insure that the gases pass under proper conditions through the bed of fluidized powder, the openings in the perforated bottom have, according to the invention a diameter preferably ranging between 0.1 and 3 mm.

Further, the distance between two adjacent openings is 1 to 20 times the diameter of the openings. The thickness of the perforated bottom itself preferably ranges between 0.1 and 10 mm. For example, with a bottom or grid 1 mm. thick, the openings in the grid are preferably 0.7 to 1.5 mm. in diameter, and are spaced 7 to 15 mm. from each other.

The recuperation chamber or group of chambers can, according to circumstances, be of the same type as the pretreating or reaction chamber; the gas outlet of the recuperation chamber is connected to the reaction chamber.

In order to illustrate the invention, there is described below a particular embodiment thereof, given by way of example and not by way of limitation, as applied to the production of anhydrous aluminum fluoride by the action of gaseous HF on powdered alumina.

The annexed drawing illustrates schematically a plant suitable for carrying out such production of anhydrous aluminum fluoride. Referring to the drawing:

A hopper 1 is supplied with alumina hydrate from a rotary filter (not illustrated); from the distributor 2 below the hopper, the alumina falls into the endless screw conveyor 3. The latter introduces the alumina hydrate into the lower end of pipe or duct 4, which constitutes here one of the pretreating chambers and serves simultaneously as dehydrator and as secondary reactor. During the operation of the system, this duct 4 is traversed from bottom to top by a stream of hot, lean HF gases which arrive by conduit 8 from the separator 16, situated above the reaction chamber 13. These gases entrain the alumina, forming a light, i.e. dilute phase suspension; the latter travels to the top of duct 4 and, simultaneously, the alumina is partially dehydrated while the HF present in the gas stream reacts with the alumina and forms the first portion of $AlF_3$.

The finely divided material fluidized in dilute phase, i.e. formed into a dilute suspension within pretreater 4, passes into separator 5. From the latter, the separated powder flows downward to the powder seal (joint) 6, from which it is removed as a fluidized bed which functions in the manner of a hydraulic seal; this function is insured by blowing in a small quantity of a suitable compressed gas, as air, via line 6' in the bottom of the seal. From separator 5 the gases, substantially free of HF, are conveyed by a suitable suction means, fan 25 and flue, to a conventional decontamination installation (not represented on the drawing).

The partially dehydrated and fluorinated alumina passes from seal 6 through conduit 7 downward to the lower end of pipe or duct 10, which constitutes the second pretreating chamber; the alumina is entrained here by a stream of hot air flowing from a heater or generator 9. The entrained mass, which travels upwardly through the duct 10, is likewise a fluidized, dilute phase system (suspension); the duct 10 serves only as a dehydrator.

Following separation within the cyclone 11, the gas passes on to a flue for suitable disposition, being drawn by a suction means, as a fan 28, while the separated powder is led via conduit 12 and seal 6—similar to that described before—to the lower end of the third pretreating chamber, that is, the pipe or duct 15. As this duct surmounts the reaction chamber 13, it is traversed by gases impoverished in HF which entrain the alumina powder, carrying it upwardly while simultaneously dehydrating and fluorinating the alumina.

The gas is separated from the powder in the cyclone 16, whence the separated partially fluorinated alumina runs down through line 17 into the interior of the main fluidization chamber 13, into the very midst of the fluidized bed 13'; the main reaction between the HF and alumina takes place in this fluidized bed.

Reactor 13 is provided with the perforated plate or grid 14 of Monel metal provided with openings 1 mm. in diameter, spaced 15 mm. from each other. The gases containing HF intended for the reaction, arrive via conduit 22 and pass upwardly through perforated plate 14 while fluidizing the alumina powder above the plate.

A stream of fluidized aluminum fluoride, produced by the reaction, leaves the dense bed 13' of the reactor through line 18 and proceeds to the bottom of the recuperating chamber 20; the latter is formed of a pipe supplied at its lower end 19 with fresh gases from an HF generator. These gases entrain the hot fluoride powder whereby the calories available in the latter are transferred to the gases by heat interchange and are thus recovered, i.e. recuperated. The heated gases, separated from the entrained fluoride in cyclone separator 21 pass, via line 22, to the reactor 13, where they serve to fluidize and react with the partially treated alumina powder in the dense bed 13', as described above, while the fluoride powder separated out in 21 flows down through line 23 into a storage bin, not shown. A blower 30 facilitates transfer of the powder to the storage bin.

The gas circulation in the system is insured by suction produced by the fans 25, 28; this produces a slight depression throughout the entire system, avoiding loss of material.

Stainless steel has been found to be a very suitable material for the construction of the main parts of the apparatus.

In a plant producing, per 24 hours, 20 tons of anhydrous aluminum fluoride containing 92% $AlF_3$, equipment having the following principal dimensions were used:

|  | Diameter, m. | Height, m. |
| --- | --- | --- |
| Duct 4 | 0.40 | 6.5 |
| Duct 10 | 0.35 | 12.0 |
| Duct 15 | 0.45 | 3.5 |
| Reactor 13 (cylindrical portion) | 3.50 | 1.0 |
| Recuperating chamber 20 | 0.40 | 7.0 |

Production carried out with this equipment under the conditions set forth below, and in the temperature tabulation, gave very satisfactory results with yields exceeding 95%. The alumina powder used in these operations had a particle size ranging between 10 and 150 microns. The gas velocities in the ducts 4, 10 and 20 were about 20 metres per second under the particular conditions tabulated below; however, this velocity can vary between 10 and 35 metres per second. The optimum gas velocity through the fluidized bed 13' ranged between 0.15 to 0.5 m. per second; generally speaking, the lower velocity was used with the finer powders and the higher velocity with the coarser powders.

The temperatures which prevailed during the production in the various parts of the system are set out in the following tabulation:

|  | Temperature, °C. | HF content of gases: grams of HF per m.³ of inert gas measured at 20° C. |
| --- | --- | --- |
| At the bottom of 20 | 150–180 | 160–260 |
| At the top of 20, i.e. in 22, at inlet to reactor 13 | 220–300 | 155–240 |
| At the bottom of duct 15, i.e. at outlet of reactor 13 | 500–600 | 20–30 |
| At the top of 15 | 350–450 | 15–25 |
| At the top of 4 | 200–300 | 15–25 |
| At the bottom of 10 | 500–700 |  |
| At the top of 10 | 300–350 |  |

The contact time of the solid (powder) with the gas was 1 to 3 seconds within chambers or zones 4, 10, 15 and 20; by contrast, it was 4 to 6 hours in bed 13' within reactor 13. The contact time of the gas with the solid was, in general, 1 to 3 seconds within the zones 4, 10, 15, 13 and 20.

By way of example, there is set out below the granulometric composition of an aluminum fluoride powder obtained by the process of the invention:

|  | Percent |
|---|---|
| Up to 100 microns | 99.5 |
| Up to 80 microns | 92 |
| Up to 65 microns | 70 |
| Up to 35 microns | 18 |
| Up to 25 microns | 7 |
| Up to 10 microns | 5 |
| Up to 5 microns | 0 |

The alumina fluoride powders had apparent densities of 1.6 to 1.85 following maximum packing (compression).

While the drawing illustrates the use of a single solids separator, e.g. 5, 11, 16 and 21, in each of the several stages of the system, it is obvious that a plurality of such separators can be used in each stage, depending on the extent of separation desired therein.

Further, and as is well known to those skilled in the art, the various transfer lines, e.g. 7, 12, etc., can be provided along the length thereof with spaced gas inlets (not shown) so that, when desired, a small amount of gas can be injected into these transfer lines for the purpose of aerating the finely divided solids and thereby facilitating their flow.

In the operation of the system to produce aluminum fluoride, hot air—furnished by heater 9—is used to supply or supplement the heat requirements of the system, particularly when starting, and to dilute the reactant gas. It is obvious that in the case of a different operation, the particular gas used for heating and/or dilution will be selected with due regard to its compatability with the type of process being carried out. To facilitate starting of the system, heating gas can be conveyed from heater 9 to duct 20 via line 31 controlled by valve 32.

As will be seen from the above description of the operation of the system according to the invention, the powdered material to be treated progresses through pretreating zone 4, principal fluidization zone 13 and recuperation zone 20 in the order named, while the treating gas flows through these zones in the reverse order. In the elongated zones, e.g. 4, 10, 15 and 20, there is concurrent flow of powdered material and gaseous medium in fluidized state.

Further, zone 10 serves the important function of controlling the temperature conditions in the several zones by suitably modifying the temperature of the powdered material as it passes through that zone, i.e. 10. While in the specific example given, i.e. manufacture of aluminum fluoride, the powdered material is heated, it may be desirable in other instances—i.e. in the case of highly exothermic chemical reactions in the principal fluidization zone—to cool the powdered material as it passes through the temperature modifying zone 10.

The term "treating" or "pretreating" as used in the appended claims denotes a treatment which produces a physical change and/or a chemical change.

It will be apparent that the process and apparatus described in the foregoing specification are eminently adapted for carrying out a chemical change in a gas, or among several gases, in the presence of a catalyst. A particular example of such a process is the chemical conversion of hydrocarbons, as cracking, hydrogenation, etc. in the presence of suitable catalysts.

In the preceding specification, the weight per litre of the light phase suspension is in the range of 0.001 to 0.0025 kg. and the weight per litre of the dense phase suspension is in the range of 0.8 to 1.5 kg.

I claim:

1. A continuous multi-stage process for producing powdered aluminum fluoride, comprising the following steps: entraining fresh undehydrated filter residue of powdered alumina hydrate in hot, lean reaction gases containing HF and thereby forming a dilute phase suspension having a weight per litre in the range of 0.001 to 0.0025 kg.; passing said suspension through at least one elongated, upwardly directed pretreating zone wherein the alumina is subjected to partial dehydration and partial fluorination; removing the suspension from the upper end of the pretreating zone into a separating zone to segregate the pretreated alumina from said reaction gases; heating the segregrated alumina and passing it to a reaction zone; passing a gaseous medium containing HF at a low velocity through the heated alumina in said reaction zone to transform thereby the powdered alumina into a dense, turbulent, fluidized bed having a weight per litre in the range of 0.8 to 1.5 kg., and to react with the alumina to form aluminum fluoride; removing from said bed a stream containing hot aluminum fluoride and introducing it into the lower end of an elongated upwardly directed recuperation zone; passing fresh HF-containing gaseous medium through the introduced fluoride to entrain the same and form a dilute phase suspension having a weight per litre in the range of 0.001 to 0.0025 kg., whereby the gaseous medium is heated by the hot fluoride; removing the suspension from the upper end of the recuperation zone into a separation zone, wherein the powdered aluminum fluoride is separated from the heated HF-containing gaseous medium; recovering the separated aluminum fluoride containing about 92% anhydrous aluminum fluoride; passing the separated, heated gaseous medium to the reaction zone to fluidize the powdered alumina therein; and removing overhead from the reaction zone hot, lean reaction gases and using them to suspend fresh powdered alumina in the pretreating zone, as described and maintaining sub-atmospheric pressure in the several zones.

2. Process according to claim 1, wherein the segregated alumina removed from the pretreating zone is mixed with heated air while it is passed through an upwardly directed, elongated zone to form a dilute phase suspension having a weight per litre in the range of 0.001 to 0.0025 kg. where the alumina is heated.

3. Process according to claim 2, wherein the fluidized bed is at a temperature of about 400–600° C. and is contacted by a gas containing 160–260 g. of HF per cubic meter inert gas at 20° C.

References Cited in the file of this patent

UNITED STATES PATENTS

| 2,534,853 | Carkeek | Nov. 29, 1947 |
| 2,538,201 | Kalbach et al. | Jan. 16, 1951 |
| 2,614,028 | Schaumann | Oct. 14, 1952 |
| 2,621,118 | Cyr et al. | Dec. 9, 1952 |
| 2,675,294 | Keith | Apr. 13, 1954 |
| 2,779,777 | Mungen | Jan. 29, 1957 |

FOREIGN PATENTS

| 1,112,752 | France | Nov. 23, 1955 |
| 656,374 | Great Britain | Aug. 22, 1951 |

OTHER REFERENCES

Othmer: "Fluidization," pages 121–122, Reinhold Publishing Corp. (1956).

In re Edward Decision, published in U.S. Patent Office Official Gazette, pages 312–315, June 12, 1956.